United States Patent
Doi et al.

(10) Patent No.: US 6,891,964 B2
(45) Date of Patent: May 10, 2005

(54) COMPUTERIZED METHOD FOR DETERMINATION OF THE LIKELIHOOD OF MALIGNANCY FOR PULMONARY NODULES ON LOW-DOSE CT

(75) Inventors: Kunio Doi, Willowbrook, IL (US); Masahito Aoyama, Hiroshima (JP); Qiang Li, Clarendon Hills, IL (US)

(73) Assignee: University of Chicago, Chicago, IL (US)

( * ) Notice: Subject to any disclaimer, the term of this patent is extended or adjusted under 35 U.S.C. 154(b) by 129 days.

(21) Appl. No.: 09/990,310

(22) Filed: Nov. 23, 2001

(65) Prior Publication Data

US 2003/0099387 A1 May 29, 2003

(51) Int. Cl.[7] .............................. G06K 9/00; G06K 9/48; G06K 9/40
(52) U.S. Cl. ...................... 382/131; 382/132; 382/170; 382/199
(58) Field of Search ................................. 382/130, 131, 382/132, 190, 195, 170, 199, 263; 600/407

(56) References Cited

U.S. PATENT DOCUMENTS

| | | | | |
|---|---|---|---|---|
| 4,079,730 A | * | 3/1978 | Wikswo et al. | 600/504 |
| 4,851,984 A | | 7/1989 | Doi et al. | |
| 5,072,384 A | * | 12/1991 | Doi et al. | 382/132 |
| 5,133,020 A | | 7/1992 | Giger et al. | |
| 5,289,374 A | | 2/1994 | Doi et al. | |
| 5,415,167 A | * | 5/1995 | Wilk | 600/407 |
| 5,668,888 A | * | 9/1997 | Doi et al. | 382/132 |
| 5,779,634 A | * | 7/1998 | Ema et al. | 600/407 |
| 5,790,690 A | * | 8/1998 | Doi et al. | 382/128 |
| 5,931,780 A | | 8/1999 | Giger et al. | |
| 6,141,437 A | | 10/2000 | Xu et al. | |
| 6,219,674 B1 | * | 4/2001 | Classen | 707/104.1 |
| 2002/0172403 A1 | * | 11/2002 | Doi et al. | 382/128 |

FOREIGN PATENT DOCUMENTS

| | | | |
|---|---|---|---|
| JP | 05130986 | | 5/1993 |
| JP | 05-130986 | * | 5/1993 |
| WO | WO99/42950 | | 8/1999 |
| WO | WO 9942950 A1 | * | 8/1999 ............ G09K/9/00 |

* cited by examiner

Primary Examiner—Mehrdad Dastouri
(74) Attorney, Agent, or Firm—Oblon, Spivak, McClelland, Maier & Neustadt, P.C.

(57) ABSTRACT

An automated computerized scheme for determination of the likelihood of malignancy in pulmonary nodules. The present invention includes steps of obtaining at least one computed tomography medical image of a pulmonary nodule in determining if the pulmonary nodule is malignant based on the examination of seven patient or image features. The method can be implemented when instructions are loaded into a computer to program the computer. The significance of employing seven patient or image features is that statistically, seven features are the most practical based on the unique implementation of statistical analysis. Out of the seven features that are now analyzed to determine if a pulmonary nodule is malignant, these features are selected to optimize the accuracy of the diagnosis of a pulmonary nodule. Through a unique sampling scheme, different embodiments of the present invention utilize different combinations of features to optimize the accuracy of the method of the present invention.

36 Claims, 12 Drawing Sheets

US 6,891,964 B2

COMPUTERIZED METHOD FOR DETERMINATION OF THE LIKELIHOOD OF MALIGNANCY FOR PULMONARY NODULES ON LOW-DOSE CT

The present invention was made in part with U.S. Government support under USPHS Grant CA24806. The U.S. Government has certain rights in this invention.

BACKGROUND OF THE INVENTION

Field of the Invention

The invention relates generally to a computerized method for determination of the likelihood of malignancy for pulmonary nodules on a low-dose CT X-ray device.

The present invention also generally relates to computerized techniques for automated analysis of digital images, for example, as disclosed in one or more of U.S. Pat. Nos. 4,839,807; 4,841,555; 4,851,984; 4,875,165; 4,907,156; 4,918,534; 5,072,384; 5,133,020; 5,150,292; 5,224,177; 5,289,374; 5,319,549; 5,343,390; 5,359,513; 5,452,367; 5,463,548; 5,491,627; 5,537,485; 5,598,481; 5,622,171; 5,638,458; 5,657,362; 5,666,434; 5,673,332; 5,668,888; 5,732,697; 5,740,268; 5,790,690; 5,832,103; 5,873,824; 5,881,124; 5,931,780; 5,974,165; 5,982,915; 5,984,870; 5,987,345; 6,011,862; 6,058,322; 6,067,373; 6,075,878; 6,078,680; 6,088,473; 6,112,112; 6,138,045; 6,141,437; 6,185,320; 6,205,348; 6,240,201; 6,282,305; 6,282,307; 6,317,617 as well as U.S. patent application Ser. Nos. 08/173,935; 08/398,307 (PCT Publication WO 96/27846); Ser. Nos. 08/536,149; 08/900,189; 09/027,468; 09/141,535; 09/471,088; 09/692,218; 09/716,335; 09/759,333; 09/760,854; 09/773,636; 09/816,217; 09/830,562; 09/818,831; 09/842,860; 09/860,574; 60/160,790; 60/176,304; and 60/329,322; co-pending applications Ser. Nos. 09/990,311, 09/990,377, 60/332,005, and 60/370,168; and PCT patent applications PCT/US98/15165; PCT/US98/24933; PCT/US99/03287; PCT/US00/41299; PCT/US01/00680; PCT/US01/01478 and PCT/US01/01479, all of which are incorporated herein by reference.

The present invention includes use of various technologies referenced and described in the above-noted U.S. Patents and Applications, as well as described in the references identified in the following LIST OF REFERENCES by the author(s) and year of publication and cross-referenced throughout the specification by reference to the respective number, in parentheses, of the reference:

LIST OF REFERENCES

1. S. Sone, F. Li, Z.-G. Yang, et al., "Results of three-year mass screening programmed for lung cancer using mobile low-dose spiral computed tomography scanner," British journal of cancer 84: 25–32 (2001).

2. K. Doi, and M. Aoyama, "Automated computerized scheme for distinction between benign and malignant solitary pulmonary nodules on chest images," U.S. Patent Application, pending (see UCHI No.885).

3. S. Katsuragawa, K. Doi, and H. MacMahon, "Image feature analysis and computer-aided diagnosis in digital radiography: detection and characterization of interstitial lung disease in digital chest radiographs," Med. Phys. 15: 311–319 (1988).

4. A. A. Amini, T. E. Weymouth, and R. C. Jain, "Using dynamic programming for solving variational problem in vision," IEEE Trans. on Patt. Anal. and Mach. Intell. 12: 855–867 (1990).

5. K. Nakamura, H. Yoshida, R. Engelmann, et al., "Computerized analysis of the likelihood of malignancy in solitary pulmonary nodules with use of artificial neural networks," Radiology 214: 823–830 (2000).

6. T. Matsumoto, H. Yoshimura, K. Doi, et al., "Image feature analysis of false-positive diagnoses produced by automated detection of lung nodules," Invest. Radiol. 27: 587–597 (1992).

7. M. Pilu, A. W. Fitzgibbon, and R. B. Fisher, "Ellipse-specific direct least-square fitting," Proc. of the IEEE International Conference on Image Processing, 599–602 (1996).

8. A. W. Fitzgibbon, M. Pilu, and R. B. Fisher, "Direct least squares fitting ellipses," Proc. of the 13th International Conference on Pattern Recognition, 253–257 (1996).

9. S. Katsuragawa, K. Doi, N. Nakamori, et al., "Image feature analysis and computer-aided diagnosis in digital radiography: effect of digital parameters on the accuracy of computerized analysis of interstitial disease in digital chest radiographs," Med. Phys. 17: 72–78 (1990).

10. T. Ishida, S. Katsuragawa, T. Kobayashi, et al., "Computerized analysis of interstitial disease in chest radiographs: improvement of geometric-pattern feature analysis," Med. Phys. 24: 915–924 (1997).

11. U. Bick, M. L. Giger, R. A. Schmidt, et al., "A new single-image method for computer-aided detection of small mammographic masses," Proc. CAR—Computer Assisted Radiography, H. U. Lemke, K. Inamura, C. C. Jaffe, et al., eds., 357–363 (1995).

12. Z. Huo, M. L. Giger, C. J. Vyborny, et al., "Analysis of speculation in the computerized classification of mammographic masses," Med. Phys. 22: 1569–1579 (1995).

13. P. A. Lachenbruch, "Discriminant analysis," Chapters 1 and 2, pages 1–39, Hafner Press, 1975.

14. R. A. Johnson and D. W. Wichern, "Applied multivariate statistical analysis," Section 5.3, pages 184–188, Prentice Hall, New Jersey, 1992.

15. B. Sahiner, H. P. Chan, N. Petrick, et al., "Computerized characterization of masses on mammograms: The rubber band straightening transform and texture analysis," Med. Phys. 24: 516–526 (1998).

16. Y. Jiang, R. M. Nishikawa, D. E. Wolverton, et al., "Malignant and benign clustered microcalcifications: automated feature analysis and classification," Radiology 198: 671–678 (1996).

17. C. E. Metz, "ROC methodology in radiologic imaging," Invest. Radiol. 21: 720–733 (1986).

18. C. E. Metz, B: A. Herman, and J. H. Shen, "Maximum likelihood estimation of receiver operating characteristic (ROC) curves from continuously distributed data," Stat. Med. 17: 1033–1053 (1998).

19. S. G. Armato, M. L. Giger, C. Moran, et al., "Computerized detection of pulmonary nodules on CT scans," RadioGraphics 19: 1303–1311 (1999).

20. S. G. Armato, M. L. Giger, and H. MacMahon, "Automated lung segmentation in digitized posteroanterior chest radiographs," Acad. Radiol. 5: 245–255 (1998).

21. W. H. Press, B. P. Flannery, S. A. Teukolsky, et al., "Numerical Recipes: The Art of Scientific Computing," pages 498–546, Cambridge University Press, 1986.

22. H. Yamada, C. Merritt, and T. Kasvand, "Recognition of kidney glamerulus by dynamic programming matching method," IEEE Trans. on Patt. Anal. and Mach. Intell. 10: 731–737 (1988).

The entire contents of each related patent and application listed above and each reference listed in the LIST OF REFERENCES, are incorporated herein by reference.

DISCUSSION OF THE BACKGROUND

Recently, medical professionals have been able to diagnose lung cancer with the aid of computed tomography (CT) imaging systems. CT systems is an X-ray device used to produce cross sectional images of organs. For instance, a CT system may be used to produce a series of cross sectional images of the human lung. Radiologists are able to examine these series of cross sectional images to diagnose pulmonary nodules. The radiologists' examinations also diagnose whether these pulmonary nodules are malignant or benign. If a radiologist confirms confidently that a pulmonary nodule is benign, further medical examination can be avoided.

However, diagnosis of pulmonary nodules is a particularly difficult task for radiologists. Typically radiologists examine the series of images produced of a human lung from a CT system. Based on the radiologist's visual examination, pulmonary nodules are identified. This process is particularly time consuming and radiologists are in fairly high demand. Further, there is an element of human error where pulmonary nodules are not diagnosed from a CT image. In some instances, radiologists are unable, from visual examination, to determine if an identified pulmonary nodule is malignant or benign and unnecessary further medical examination may be performed. Unnecessary medical examination is undesirable for several reasons. One reason is that such unnecessary medical examinations are financially costly, which is undesirable for both patients and health care providers. Another reason is that further medical examination is often painful for the patient. For instance, further medical examination may entail additional X-ray taken of the patient, which has adverse side effects. Another reason is that if unnecessary medical examinations can be avoided, more patients can be treated by the limited number of CT imaging devices and available radiologists. It is also important that the diagnosis of pulmonary nodules is accurate, so malignant pulmonary nodules can be diagnosed during the early stages of lung cancer. There is a tendency among radiologists to assume that a pulmonary nodule is malignant if it is indeterminable whether the pulmonary nodule is benign or malignant. However, according to recent findings on low-dose helical CT screenings of lung cancer, 83% of 605 patients with suspicious pulmonary nodules have benign lesions, whereas there are only 105 patients with malignancy. Accordingly, a majority of patients with suspicious pulmonary nodule do not need further medical examination after initial screening on a low-dose helical CT. However, many patients with benign pulmonary nodule undergo further medical examination, because of human error or the indeterminability during initial screening to determine that suspicious pulmonary nodules are benign.

SUMMARY OF THE INVENTION

The above-mentioned deficiencies of diagnosis of pulmonary nodules are mitigated by the present invention which relates to a method and system for determining if a pulmonary nodule is malignant. The method and system the present invention includes the steps of obtaining at least one medical image of a pulmonary nodule and determining if the pulmonary nodule is malignant based on the examination of seven patient or image features.

In embodiments of the present invention, the patient features comprise the sex of the patient. In embodiments of the present invention, the image features of a pulmonary nodule are extracted from a CT image of the pulmonary nodule. In embodiments of the present invention, the image features comprise effective diameter of the pulmonary nodule, contrast of the pulmonary nodule, overlap measure of two gray-level histograms from the inside and outside regions of a segmented nodule of the image, overlap measure of two gray-level histograms from inside and outside regions of a segmented nodule of a edge gradient of the image, the radial gradient index for an inside region of a segmented nodule of an image, and peak value of a histogram for an inside region of a segmented nodule of an edge gradient of an image.

Out of the features that are analyzed to determine if a pulmonary nodule is malignant, seven features are selected to optimize the accuracy of the diagnosis of a pulmonary nodule. Through a unique sampling scheme, different embodiments of the present invention utilize different combinations of features to optimize the accuracy of the method of the present invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein.

DETAILED DESCRIPTION OF THE PREFERRED EMBODIMENTS

Materials and Methods

Figure 1:
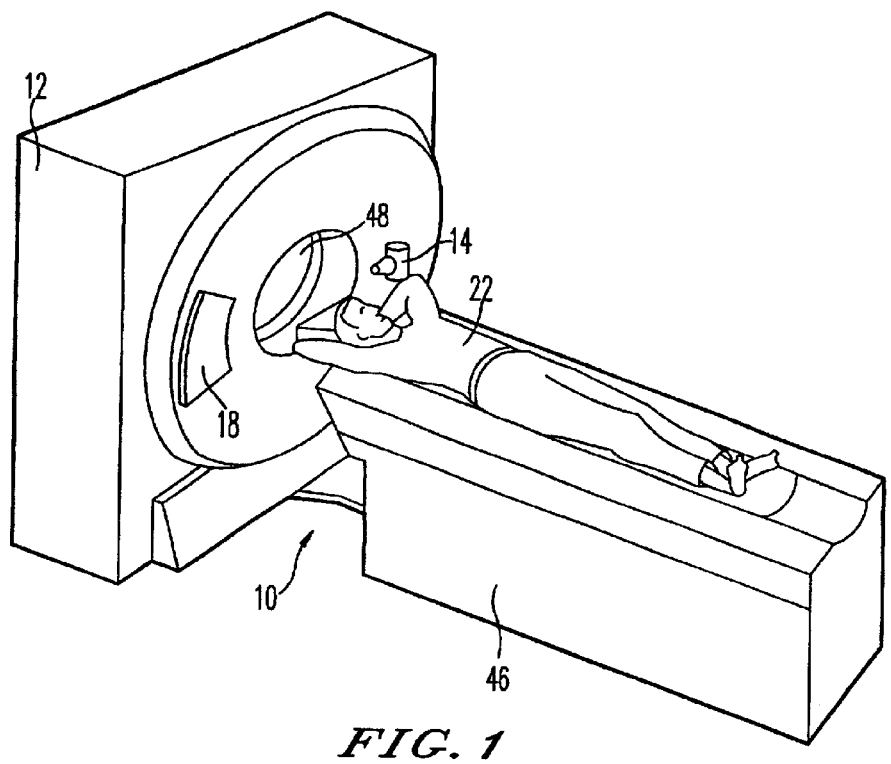
FIG. 1 is a pictorial view of a CT imaging system.
Figure 2:
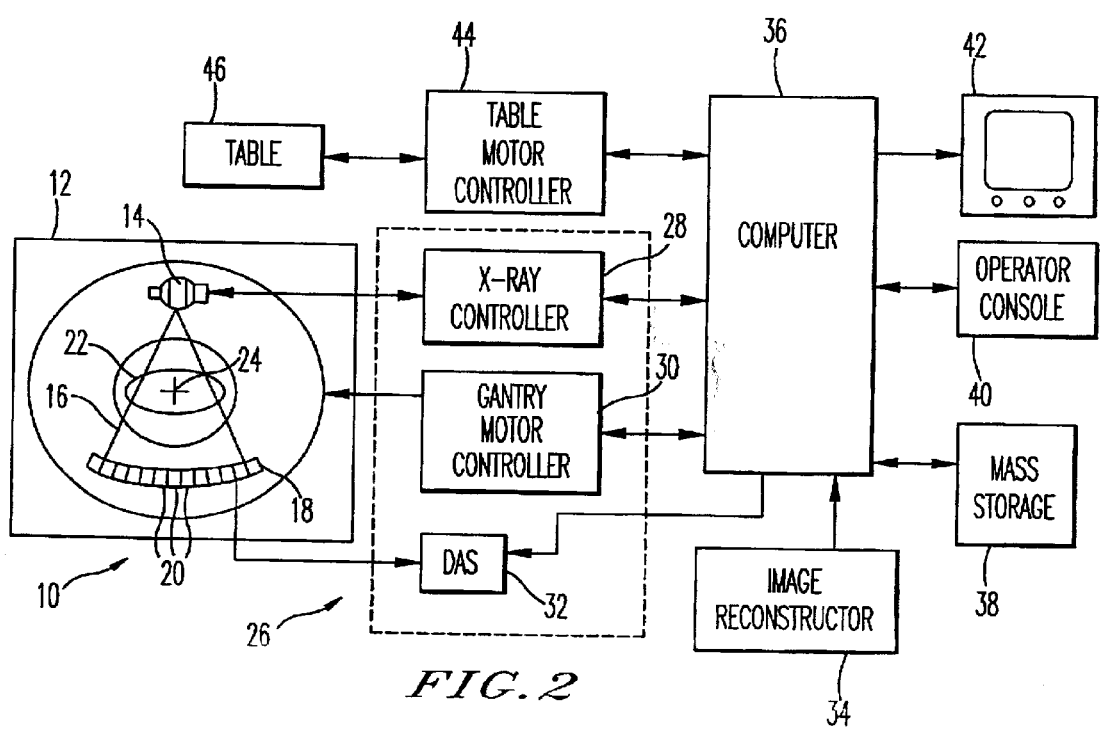
FIG. 2 is a block schematic diagram of the system illustrated in FIG. 1.

Referring to FIGS. 1 and 2, an exemplary computed tomography (CT) imaging system 10 is shown as including a gantry 12. Gantry 12 has an X-ray source 14 that projects a beam of X-rays 16 toward a detector array 18 on the opposite side of gantry 12. Detector array 18 is formed by detector elements 20 which together sense the projected X-rays that pass through a medical patient 22. Each detector element 20 produces an electrical signal that represents the intensity of an impinging X-ray beam and hence the attenuation of the beam as it passes through patient 22. During a scan to acquire X-ray projection data, gantry 12 and the components mounted thereon rotate about a center of rotation 24.

Rotation of gantry 12 and the operation of X-ray source 14 are governed by a control mechanism 26 of CT system 10. Control mechanism 26 includes an X-ray controller 28 that provides power and timing signals to X-ray source 14 and a gantry motor controller 30 that controls the rotational speed and position of gantry 12. A data acquisition system (DAS) 32 in control mechanism 26 samples analog data from detector elements 20 and converts the data to digital signals for subsequent processing. An image reconstructor 34 receives sampled and digitized X-ray data from DAS 32 and performs high speed image reconstruction. The reconstructed image is applied as an input to a computer 36 which stores the image in a mass storage device 38.

Computer 36 also receives and supplies signals via a user interface, or graphical user interface (GUI). Specifically computer receives commands and scanning parameters from an operator via console 40 that has a keyboard and a mouse (not shown). An associated cathode ray tube display 42 allows the operator to observe the reconstructed image and other data from computer 36. The operator supplied commands and parameters are used by computer 36 to provide control signals and information to X-ray controller 28, gantry motor controller 30, DAS 32, and table motor controller 44.

FIG. 3 illustrates three exemplary malignant and three exemplary benign solitary pulmonary nodules, which are located at the center of regions of interest (ROIs). The center of the ROI (80×80 matrix size, 12-bit gray-scale) corresponds to the central location of a nodule.

The Inventors constructed a database consisting of seventy-six primary lung cancers and four hundred thirteen benign nodules, which were obtained from a lung cancer screening on 7,847 screenees with LDCT (25–50 mAs, 10 mm collimation, pitch 2, 10 mm reconstruction interval). Primary lung cancers were proved by pathologic diagnosis, and benign nodules were confirmed by diagnostic follow-up examinations or surgery. The size of the nodules was less than 30 mm. Some nodules were recognized over a few slices in LDCT images. Seventy-six primary lung cancers consisted of twenty-two nodules with a single slice LDCT image, thirty-seven nodules with two slice LDCT images, and seventeen nodules with three slice LDCT images, thus yielding a total of 147 slices of malignant nodules (1×22+ 2×37+3×17). Four hundred thirteen benign nodules consisted of two hundred sixty-five nodules with a single slice LDCT image, one hundred thirty-three nodules with two slice LDCT images, and fifteen nodules with three slice LDCT images, which provided a total of 576 slices of benign nodules (1×265+2×133+3×15).

Nodules were segmented from LDCT images by use of a dynamic programming technique, as will be discussed below. Forty-three features for lung nodules on a low-dose helical CT (LDCT) were extracted and examined by the Inventors. In addition to two clinical parameters (age and sex), forty-one image features were determined by use of the outline of the nodule, and other image information from inside and outside regions of the segmented nodule. The width of the outside region was 5 mm, which was determined empirically. Feature values based on image analysis were determined by use of the LDCT image and the corresponding edge gradient image, which was obtained by use of a Sobel filter. The matrix size of the Sobel filter was 5×5 pixels, which appeared to provide nodule edges conspicuously in the edge gradient image. The forty-one image features included seven features based on the outline, and two features based on linear patterns included in the LDCT image, four features based on edge orientation of the edge gradient image, four features based on gray-level distribution of the LDCT and the edge gradient images (4×2=8), and ten features based on the relationship between the two histograms in the inside and outside regions of the segmented nodule for LDCT and the edge gradient images (10×2=20).

The effective diameter of a nodule outline is defined by the diameter of a circle with the same area as that of the outline. The degree of circularity is defined by the fraction of the overlap area of the circle with the nodule outline. The degree of ellipticity is defined in the same manner as the degree of circularity, by use of an ellipse instead of a circle fitted to the nodule outline. The degree of irregularity is defined by 1 minus the perimeter of the circle divided by the length of the nodule outlines whereas the degree of elliptical irregularity is computed by use of the perimeter of the fitted ellipse. The root-mean-square variation and the first moment of the power spectrum are obtained by use of Fourier transformation of the distance from the nodule outline to the fitted ellipse.

The magnitude of the line pattern components for both the inside and outside regions of the segmented nodule is determined by use of a line enhancement filter, in a direction within 45 degrees of the radial line from the center of the ROI. The radial gradient index is computed by the mean absolute value of the radial edge gradient projected along the radial direction for both the inside and outside regions of the segmented nodule. The tangential gradient index is also computed by the mean absolute value of the tangential edge gradient projected along the tangential direction for both the inside and outside regions of the segmented nodule. The mean pixel value and the relative standard deviation are defined for both the inside and outside regions of the segmented nodule.

The overlap measures between two histograms are defined by the overlap area of gray-level histograms between the inside and outside regions of the segmented nodule. In addition, the difference of the mean pixel value, the pixel value at the peak, the peak value, the full width at half maximum (FWHM), and the full width at tenth maximum for gray-level histograms for both the inside and outside regions of the segmented nodules were used as features. The contrast of a nodule are defined by the difference in the mean pixel values between the 7×7 pixel area in the center of the ROI and the outside region of the segmented nodule.

Figure 3C:
FIG. 3 illustrates three exemplary malignant nodules (a), (b), (c) and three benign nodules (d), (e), (f) on low-dose helical CT.
Figure 3F:
Figure 3B:
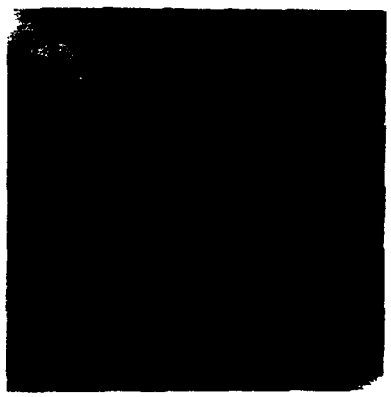
Figure 3E:
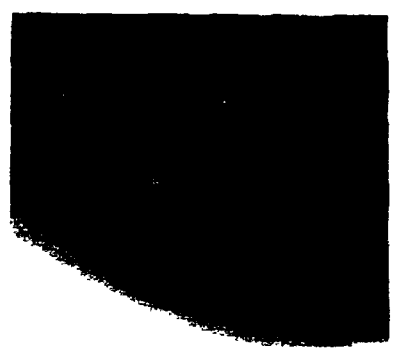
Figure 3A:
Figure 3D:
Figure 4A:
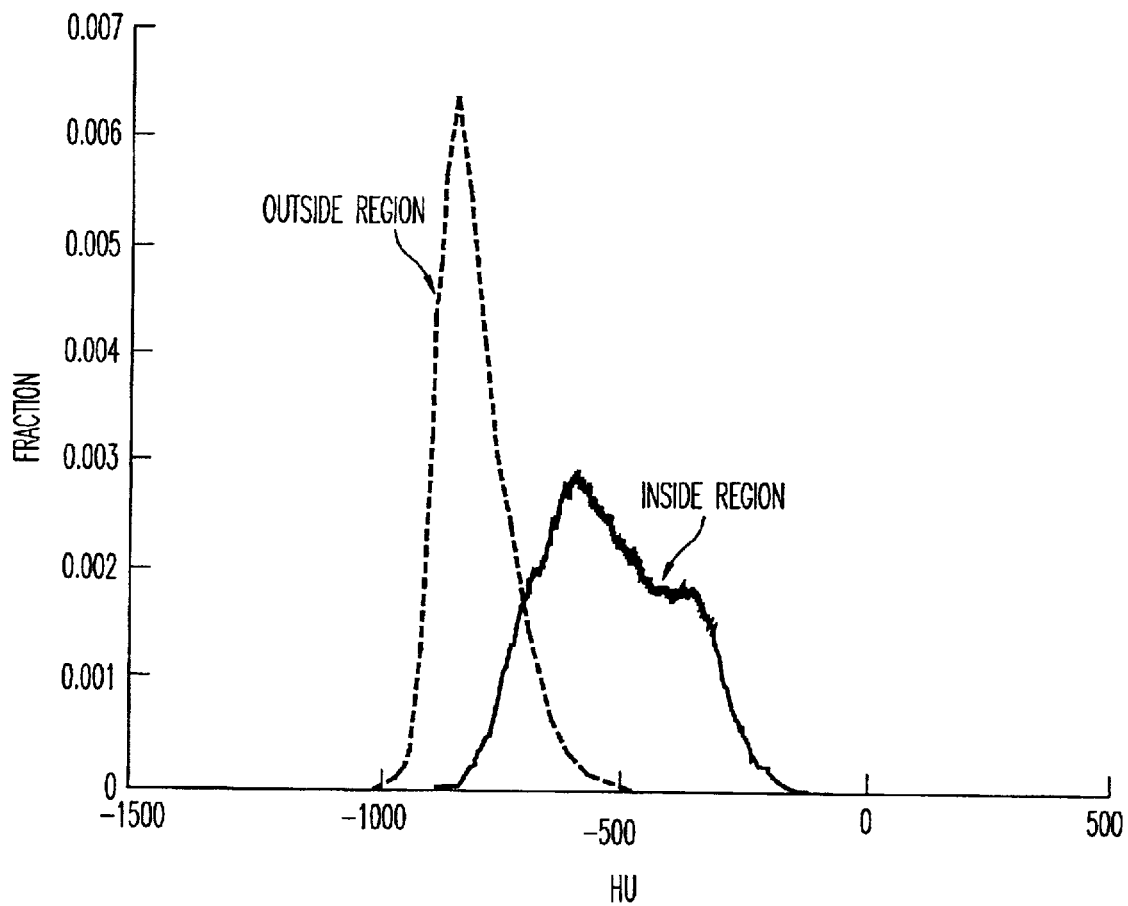
FIG. 4 is an exemplary gray-level histogram for inside and outside regions of the segmented nodule for the malignant nodule in FIG. 3(a) and the benign nodule in FIG. 3(f).
Figure 4B:
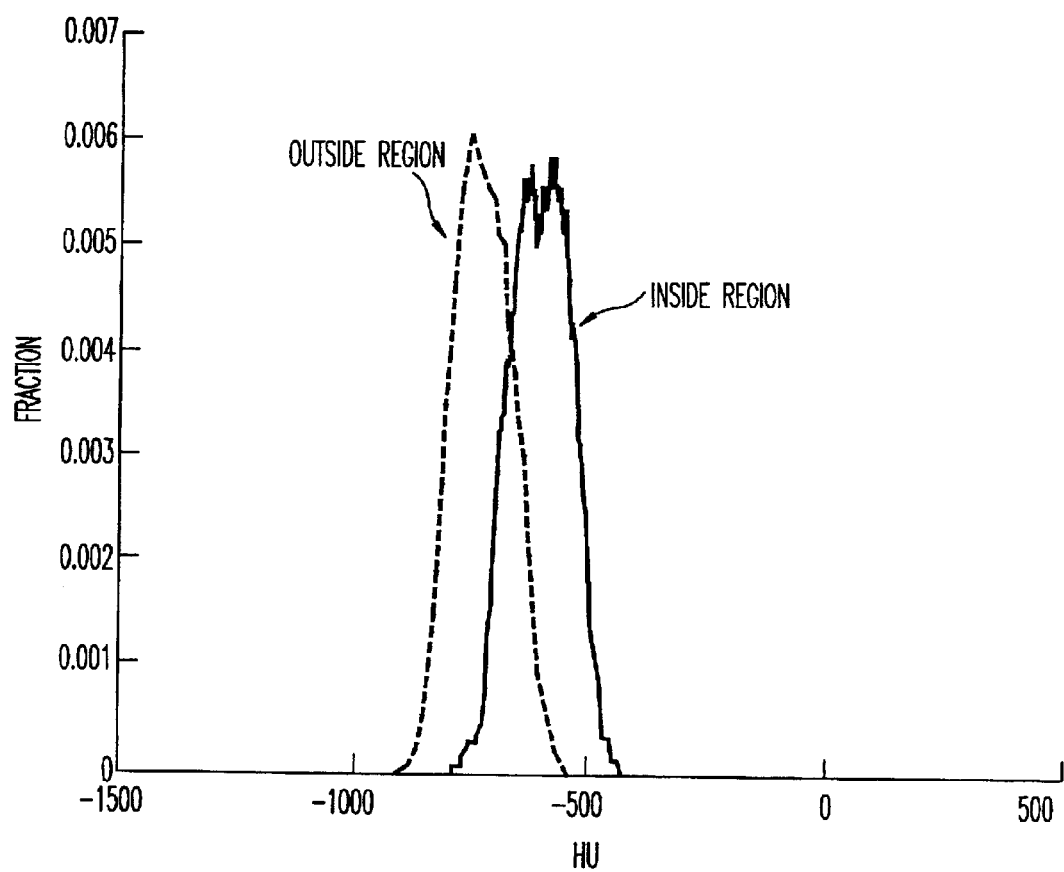

FIG. 4 shows gray-level histograms of two exemplary nodules ((a): malignant in FIGS. 3(a), (b): benign in FIG. 3(f) for the inside and outside regions of the segmented nodule on the LDCT image.

Figure 5:
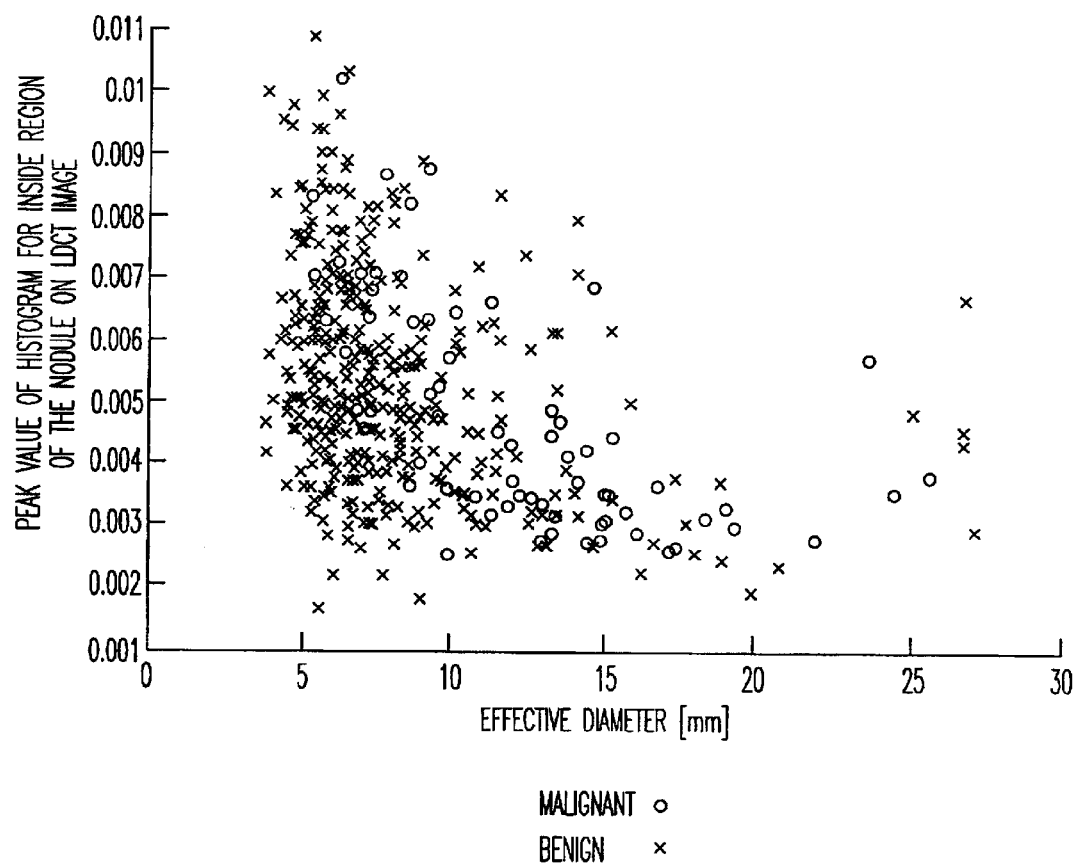
FIG. 5 illustrates the relationship between effective diameter and peak value of the histogram for the inside region of the segmented nodule on LDCT image.

FIG. 5 shows the relationship between the effective diameter and the peak value on the LDCT image for benign and malignant nodules. Although the distributions in FIG. 5 indicate a considerable overlap between benign and malignant nodules, the result appears to indicate the possibility of distinction between benign and malignant nodules. The malignant nodules tend to have a large effective diameter and small peak value, whereas benign nodules tend to have large peak values even with a relatively small effective diameter. This result seems to correspond to the observation in FIG. 4, i.e., malignant nodules generally have a lower peak and wider width in histograms than do benign nodules, when the effective diameter is large.

A linear discriminant analysis (LDA) was used as classifier of features. The Inventors realized that computation of all combinations of some features selected from all forty-three features is not practical. Accordingly, the Inventors employed Wilks lambda. Wilks lamda is the ratio of within-group variance to the total variance. The F-value, which is a cost function based on Wilks lambda, was used to find an initial selection for the number of features and their combination, as a seed, with LDA.

The Inventors examined combinations of features by an iterative procedure, where features are added and removed one-by-one by use of two thresholds on the F-value, one for removal and another for addition. In this examination, the same threshold for removal and addition was employed. The number of selected features depends on this threshold. For example, when the threshold level decreased from 4 to 3 to 2 to 1, the number of selected features increased from 3 to 7 to 7 to 12, respectively, with corresponding Az values of 0.822, 0.823, 0.823, and 0.815. Therefore, the optimal number of features was determined to be seven, because of the highest Az value.

The Inventors experimented with many different combinations of seven features. The features were repeatedly tried for appending and deleting the preselected seven features. The effective diameter and the contrast of the nodule in the LDCT image were always kept among seven features because these two features are particularly important features for diagnosis by radiologists. The determined optimal combination consisted of (1) the effective diameter, (2) the contrast of the segmented nodule on the LDCT image, (3) sex, (4) the overlap measure of two gray-level histograms for the inside and outside regions of the segmented nodule on the LDCT image, (5) the overlap measure of two gray-level histograms for the inside and outside regions of the segmented nodule on the edge gradient image, and (6) the radial gradient index for the inside region of the segmented nodule on the LDCT image, (7) the peak value of the histogram for the inside region of the segmented nodule on the edge gradient image. This combination provided an Az value of 0.828.

The Inventors used a round-robin (leave-one-out) test for training and testing of the LDA. Training was carried out with all cases except one in the database, and the one case not used for training was applied for testing with the trained LDA. This procedure was repeated until every case in the database was used once. LDA separates benign from malignant nodules by use of a hyperplane. The output value of LDA represents the distance of either a benign or a malignant nodule from the hyperplane. The output value of the LDA is normalized as the likelihood of malignancy such that the maximum distance in one direction for a benign nodule and the maximum distance in another direction for a malignant nodule from the hyperplane correspond to 0 and 1.0, respectively. The output value was considered to indicate more malignancy, if its likelihood of malignancy was far from the hyperplane (i.e., close to 1.0), and vice versa. In addition, it was considered to be "less definitive" when the value of the likelihood of malignancy was close to the hyperplane. The performance of the automated computerized scheme was evaluated by use of ROC analysis. The area under the ROC curve, Az, was used as a measure of performance. The LABROC4 program was used for obtaining the ROC curves. In addition, the statistical significance was determined by the bivariate test in ROCKIT.

The likelihood of malignancy for a pulmonary nodule in CT images can be determined by two different methods. One is based on single slice LDCT images. Another is based on multiple slices, which include some parts of nodules in LDCT images. In a method by use of single slice LDCT images, only one slice including the largest effective diameter of a nodule was used for determination of the likelihood of malignancy. In another method with the use of multiple slices of nodule images, four different techniques can be used for data integration of all slices of nodule images in order to determine the likelihood of malignancy representing a nodule appeared in a few slices. First, the distances from the hyperplane for nodules in all slices were determined independently. Then, the likelihood of malignancy was determined from (1) the largest distance among those distances for all slices with the nodule, (2) the shortest distance among those distances for all slices with the nodule, (3) the mean distance of those distances for all slices with the nodule, (4) the weighted mean distance of those distances for all slices with the nodule by use of the effective diameter of the nodule at each slice as the weighting factor.

Figure 10:
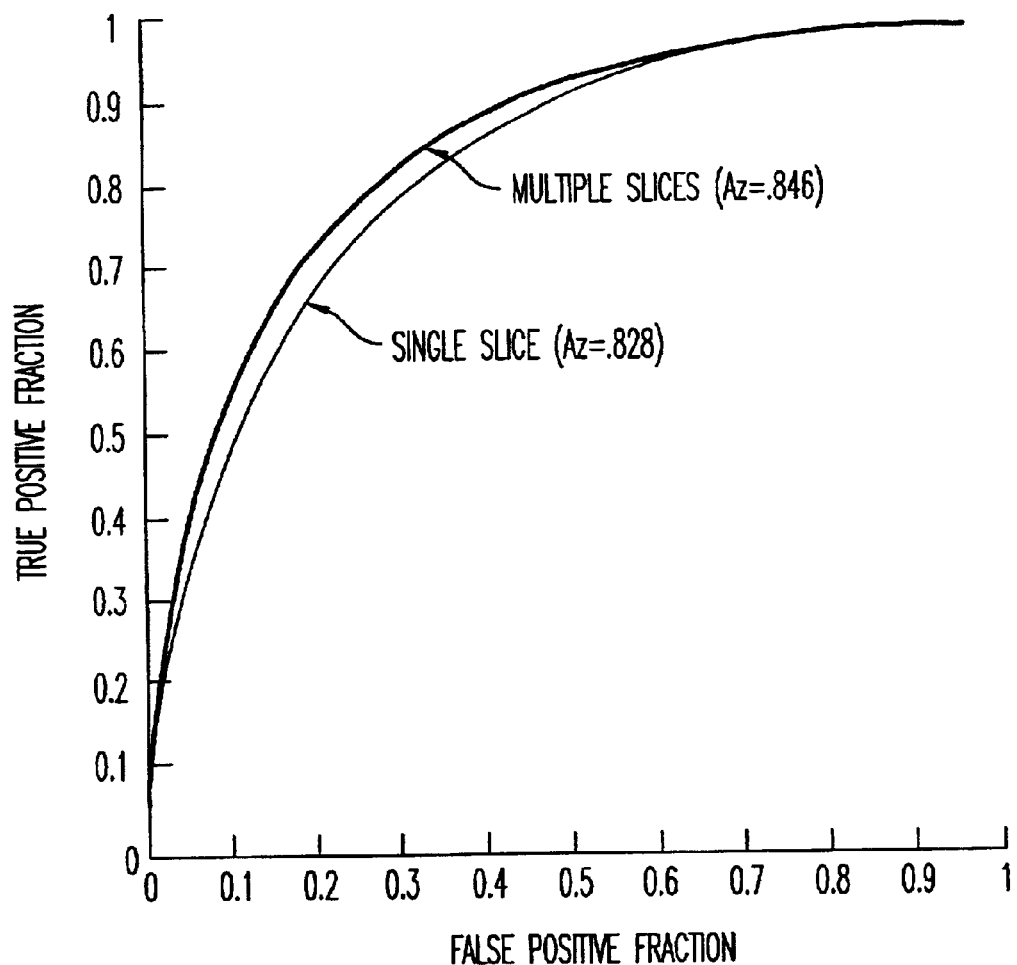
FIG. 10 illustrates ROC curves obtained by use of the LDA with seven features for distinguishing benign nodule from malignant one.

FIG. 10 shows two ROC curves obtained with the single slice and the multiple slices methods for distinguishing between benign and malignant nodules, by use of our automated computerized scheme. Table 1 shows a comparison of Az values obtained with the single slice method for several different combinations of features which provided Az values greater than or equal to 0.825, and also the corresponding Az values obtained with the multiple slices method. The largest Az value obtained by the computerized scheme for single slice LDCT images in distinguishing benign from malignant nodules was 0.828. However, the Az value was improved to 0.846 by use of multiple slice LDCT images (P=0.03).

Figure 11A:
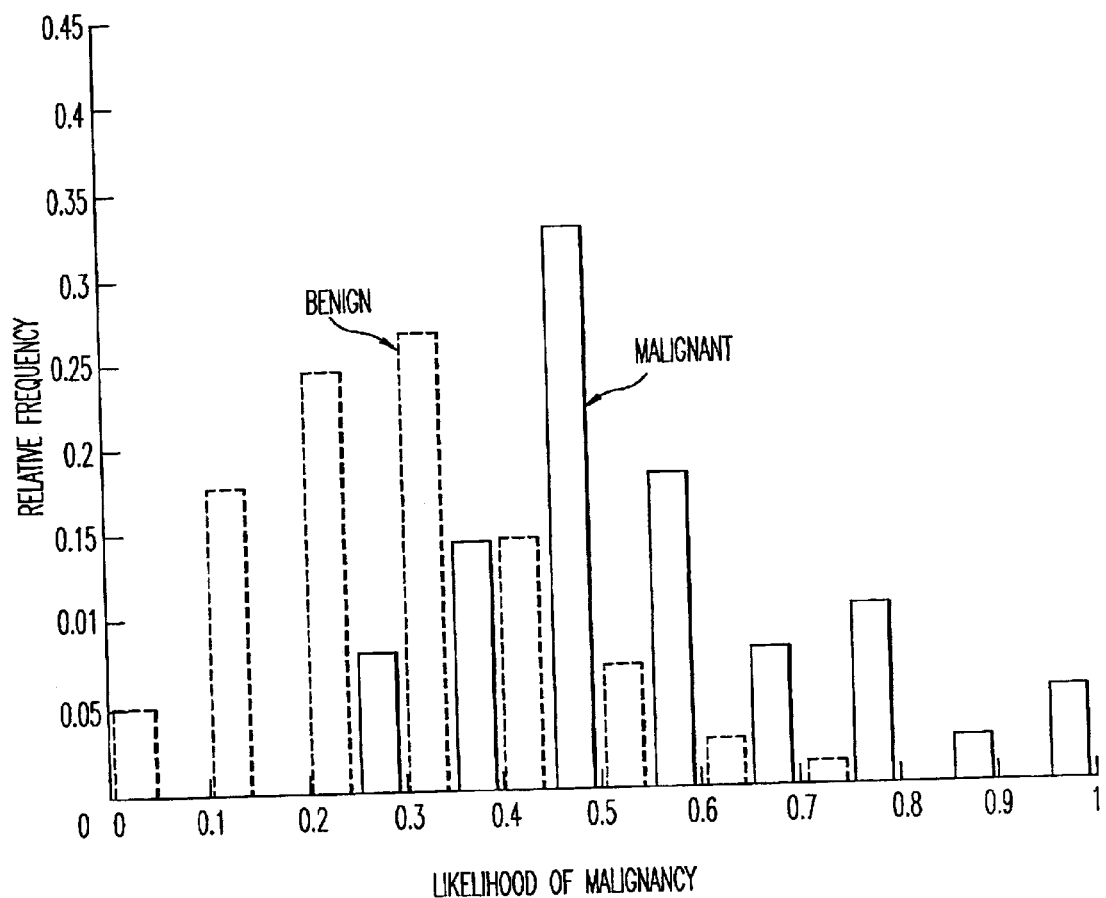
FIG. 11 illustrates distributions of LDA output indicating the likelihood of malignancy obtained with (a) single slice method and (b) multiple slice method.
Figure 11B:
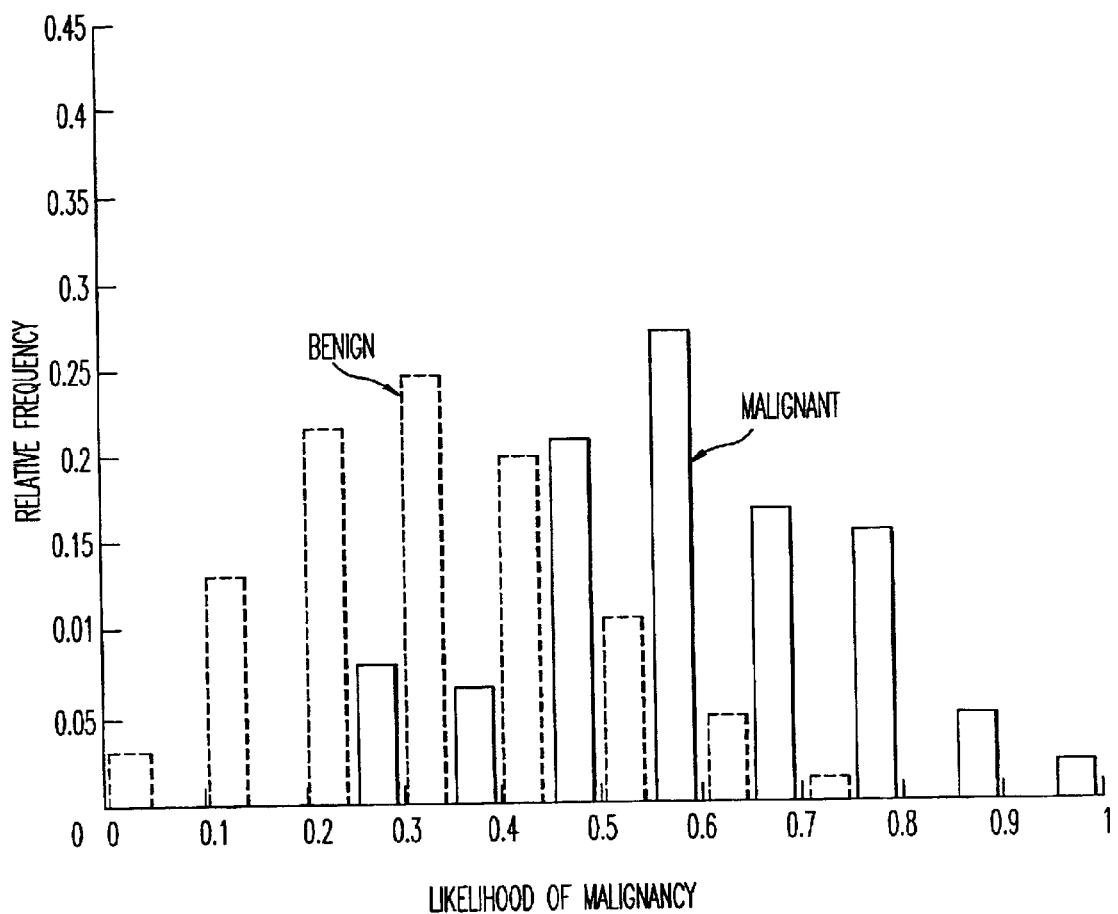

FIGS. 11(a) and (b) show the distributions of the LDA output obtained with single slice LDCT images and multiple slice LDCT images, respectively. FIG. 11(b) indicates a better separation in distinguishing between benign and malignant nodules than does FIG. 11(a), which is consistent with the result obtained with Az values.

TABLE 1

| Feature combination | Single slice image | Multiple slice images | | | |
|---|---|---|---|---|---|
| | | Az(1 | Az(2 | Az(3 | Az(4 |
| 1–7 | .828 | .809 | .846 | .841 | .840 |
| 1–6, 8 | .827 | .803 | .843 | .837 | .836 |
| 1–6, 9 | .827 | .809 | .842 | .838 | .837 |
| 1–5, 7, 10 | .826 | .808 | .845 | .839 | .839 |
| 1–5, 7, 8 | .825 | .801 | .845 | .838 | .838 |

Common features: (1) effective diameter, (2) contrast of the segmented nodule on the CT image, (3) sex, (4) overlap measure of two gray-level histograms for the inside and outside regions of the segmented nodule on the LDCT image, (5) overlap measure of two gray-level histograms for the inside and outside regions of the segmented nodule on the edge gradient image.

Other features: (6) radial gradient index for the inside region of the segmented nodule on the LDCT image, (7) peak value of the histogram for the inside region of the segmented nodule on the edge gradient image, (8) pixel value at the peak of the histogram for the inside region of the segmented nodule on the edge gradient image, (9) pixel value at the peak of the histogram for the inside region of the segmented nodule on the LDCT image, (10) full width at half maximum of the histogram for the inside region of the segmented nodule on the LDCT image.

A mask ROI is a small binary image, in which a pixel value of 1 or 0 indicates a pixel inside or outside a lung region, respectively. The mask ROI contains important information for the segmentation of nodules and for the determination of the features of nodules. In order to obtain a mask ROI for lung regions, said lung regions are segmented from background for each section of the LDCT scan by use of a thresholding technique. A pixel with a CT value between −400 HU and −1000 HU is considered as being located inside the lung regions and was thus assigned a value of 1; otherwise, the pixel is considered as belonging to background and was thus assigned a value of 0. If a nodule is connected to the pleura, the nodule would be excluded from the lung regions because the gray-scale values for the pixels inside the nodule would be out of the range between −400 HU and −1000 HU. A rolling-ball algorithm is employed along the outlines of lung regions to compensate for this type of segmentation error. After the lung regions were segmented from the background in the entire section, a mask ROI of 80×80 pixels is determined at the location of a nodule from the segmented binary image. The nodule segmentation technique is applied only to those pixels inside the lung regions.

Figure 7C:
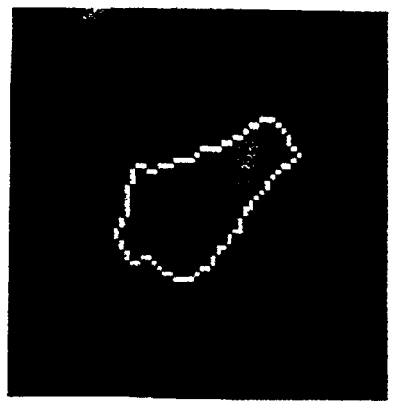
FIG. 7 is an exemplary illustration of the nodule segmentation (see FIG. 3(a)), with original LDCT image (a), edge candidate points (b), and segmentation result (c).

In order to segment a nodule from background, a preprocessing step is utilized for correction of the background trend included in an original ROI. The background trend in the ROI was represented by a two-dimensional (surface) linear function, and the three coefficients of the linear function were determined by a least square method. The estimated surface function was then subtracted from the original ROI to provide a background-trend corrected ROI. Only the pixels inside the lung regions are employed for the determination of the coefficients of the linear function. Next, a multiple-thresholding technique is applied to the background-trend corrected ROI for creation of a set of binary images. The initial threshold is selected to be the gray-scale value of the pixel at the center of the ROI, and the subsequent thresholds are gradually decreased with an increment of 5 HU until all the pixels in the lung regions are segmented as object pixels (i.e., with a value of 1 in the segmented image). The increment of 5 HU is empirically determined in this study. For each of the binary images, the contour of the nodule region including the center of the ROI is delineated, and the intersection points between the contour and a set of evenly distributed radial lines pointing outward from the center of the ROI are determined. In the exemplary illustration of FIG. 7, there are a total of 60 such radial lines with an angle of 6 degrees between two adjacent lines.

Figure 6:
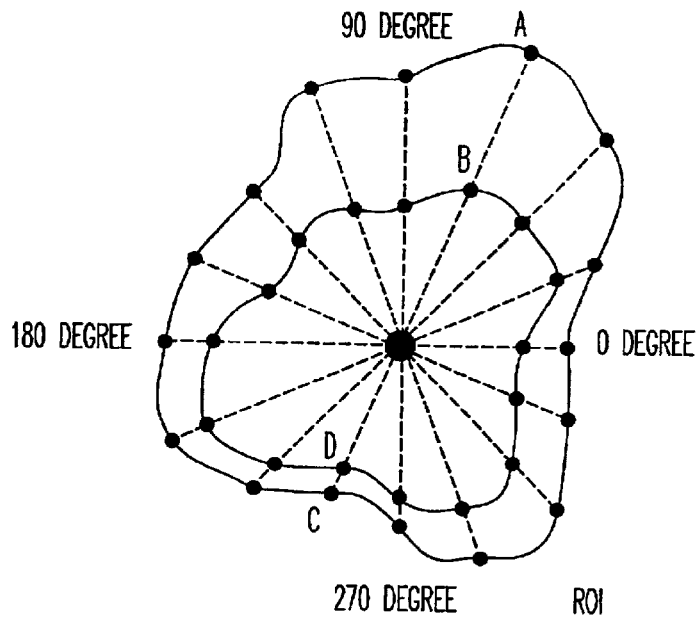
FIG. 6 is an exemplary schematic illustration for the outlines of two segmented regions (solid curves), a set of radial lines (dashed lines), and the intersection points (solid circles) between the outlines and the radial lines.

FIG. 6 shows schematically the contours of two regions (solid curves), sixteen radial lines (dashed lines), and thirty-two intersection points (solid circles) between the contours and the radial lines. There are many contours and intersection points in the process of nodule segmentation. Because the intersection points A and B are located far away from each other, the gradient of pixel values from A to B has a small magnitude, which implies a slow change of pixel values from A to B. Therefore, it is unlikely that the intersection points A and B are on a clear edge. On the other hand, because the intersection points C and D are close to each other, the magnitude of the gradient of pixel values from C to D is large, which implies that the intersection points C and D would be located on an edge. Therefore, if the distance between two consecutive intersection points on a radial line is smaller than 1.5 pixels (approximately 0.9 mm), the two points are considered to belong to the same edge. If more than three consecutive intersection points on a radial line satisfied the above condition, an edge point is found, and its location is defined as that of the middle point of those consecutive intersection points. The larger the number of such consecutive intersection points, the more likely it is that these points constituted a significant edge point. Therefore, the number of the intersection points on an edge point provide important information for the edge point, and is employed for the segmentation of nodules by use of a dynamic programming technique.

Figure 7B:
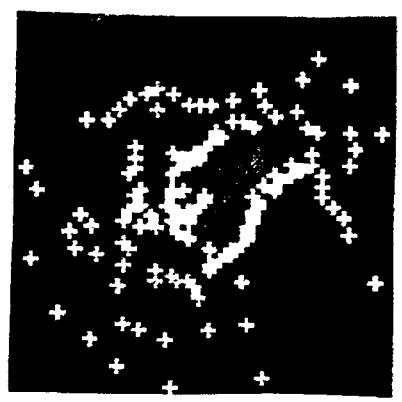
Figure 7A:
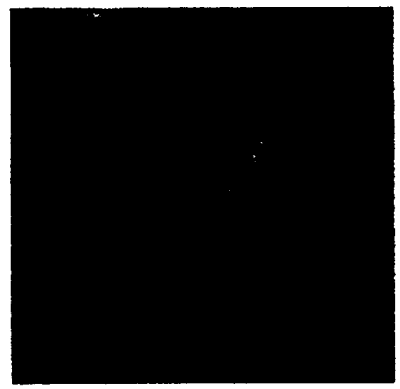
Figure 9A:
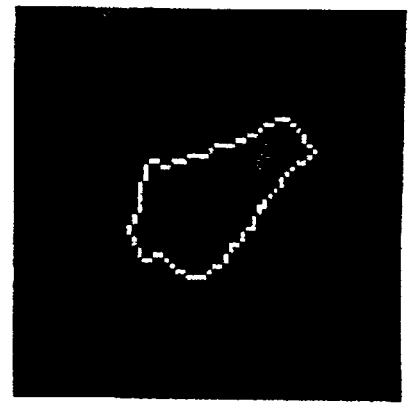
FIG. 9 illustrates extracted nodule regions by the automated nodule segmentation for malignant nodules (a), (b), (c) and benign nodules (d), (e), (f).
Figure 9B:
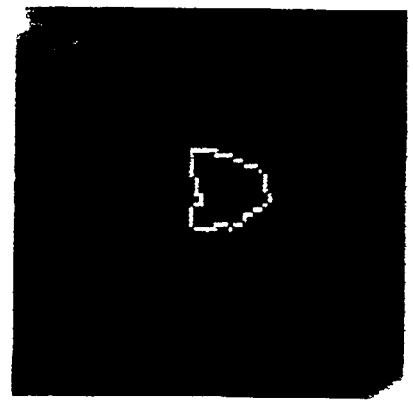
Figure 9C:
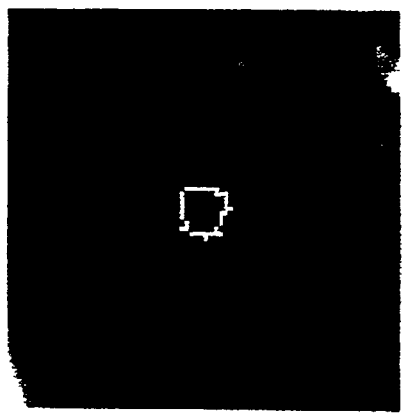
Figure 9D:
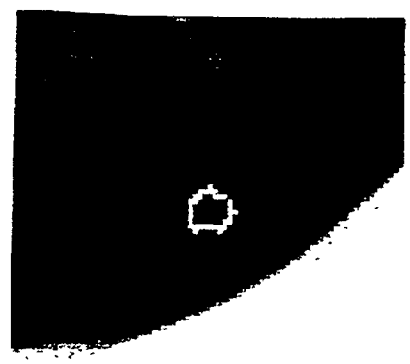
Figure 9E:
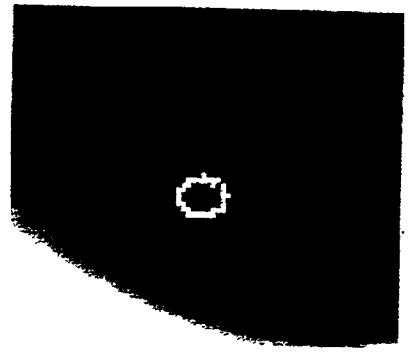
Figure 9F:

FIG. 7 shows an example for (a) the original image with a nodule at the center, (b) the original image with the detected edge points, and (c) the original image with the delineated outline for the nodule by use of a dynamic programming technique. FIG. 7 illustrates that the pixels within the nodule include a large variation in the gray-scale values, and the pixels around the nodule contain a complex background such as vessels. Therefore, it is difficult to segment this nodule by use of a conventional thresholding technique. Although most of the edge points along the outline of the nodule were detected in FIG. 7(b) with the technique described above, there are still a small number of missing edge points along the outline of the nodule, and some erroneous "edge" points caused by the complex background. In order to employ a dynamic programming technique to determine a reliable outline for a nodule, the outline of the nodule as a series of 60 outline nodes is defined, each of which is located on a radial line. For those radial lines with no edge point, a virtual interpolated edge point is created based on the information on edge points on the adjacent radial lines. Radial lines with multiple edge points are selected as outline node by a dynamic programming technique.

Dynamic programming is a technique for solving combinatorial optimization problems, in which the solution space is so large that the conventional optimization techniques can not provide an optimal solution by enumerating and comparing each of all possible solutions. For example, if there are two edge points on each of 60 radial lines, the number of all possible solutions (outlines) is $2^{60}$, which is such a large number that it is impossible to find an optimal outline by comparing each of all possible outlines. However, with a dynamic programming technique, it is possible to determine an optimal outline (in terms of a cost function) among all possible ones by use of a multiple-stage decision process. The problem of determining an optimal outline with 60 nodes is divided into a problem of 60 stages, each of which represented an optimal "simple" decision made in the process when proceeding from a previous radial line to a current one. This decomposition is possible because the optimal solution at stage J depended only on the optimal solution at stage (J-1) and the optimal simple decision from stage (J-1) to stage J, and does not depend on the optimal solutions at earlier stages (J-2), (J-3), . . . , 1.

Figure 8:
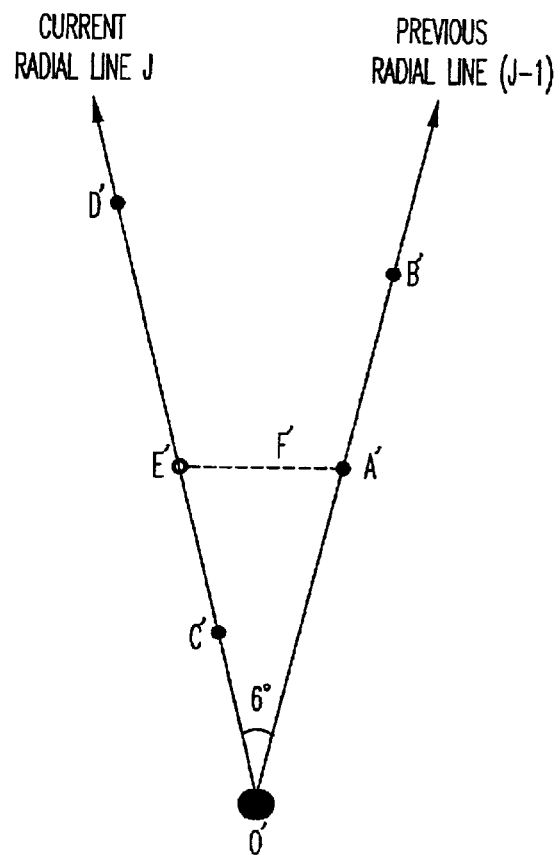
FIG. 8 is a schematic illustration for two adjacent radial lines (solid lines), four edge points on the radial lines (solid circles A, B, C, and D), and a virtual edge point (open circle E) that were used in the determination of an optimal outline for a nodule by use of a dynamic programming technique.

FIG. 8 shows two adjacent radial lines (solid lines), four edge points on the radial lines (solid circles A', B', C', and D'), and a virtual interpolated point (open circle E') that was used in the determination of an optimal outline for a nodule by use of a dynamic programming technique. O' was the center of an ROI containing a nodule. For the purposes of this discussion, assume that the two partial optimal outlines (including (J-1) nodes) starting from the edge points on the first radial line to the edge points A' and B' on the radial line (J-1) were known. Also known are the costs of the two partial optimal outlines to the edge points A' and B', namely, Total cost(A') and Total cost(B'). With a dynamic programming technique, it is straightforward to determine the costs for two partial optimal outlines of J nodes starting from the edge points on the first radial line to the edge points C' and D' on the radial line J. For example, when Total cost(A')+ Local cost(A',C') was smaller than Total cost(B')+Local cost(B',C'), then the partial optimal outline to C' (including J nodes) would consist of that to A' (including (J-1) nodes) and the edge point C', and the cost of the partial optimal outline to C' was defined by $$\text{Total cost}(C')=\text{Total cost}(A')+\text{Local cost}(A',C'). \quad (1)$$

Here, Local cost(A',C') represents a local cost function from the edge point A' to C'. Similarly, the partial optimal outline to D' and its associated cost could be determined. This process constituted a stage of a dynamic programming technique, and was recurred until J was equal to 60. At the final stage (J=60), if Total cost(C') was smaller than Total cost(D'), then the optimal outline to C' (including 60 nodes) is considered to be better than that to D', and the edge point C' was considered to be a node on the optimal outline. According to Eq. (1), it is also apparent that the edge point A' on the radial line (J-1) was another node on the optimal outline. Similarly, from the node A', an edge point on the radial line (J-2) could be obtained as a third node on the optimal outline. Repeating this backward tracing process for 60 times, all the nodes on the optimal outline for a nodule could be determined. Therefore, a dynamic programming technique is composed of two processes, a forward process for the cost calculation and a backward process for the tracing of nodes on the optimal outline.

The local cost function Local cost(A',C') generally consisted of two components, i.e., an internal cost function and an external cost function, $$\text{Local cost}(A',C')=W\times\text{Int cost}(A',C')+\text{Ext cost}(C'), \quad (2)$$

where Int cost(A',C') and Ext cost(C') are the internal cost function and the external cost function, respectively, and W is a constant that makes the range of values for the two cost functions comparable, as will be described later. In this study, the internal cost function Int cost(A',C') was defined as a normalized distance between A' and C', $$\text{Int cost}(A',C')=2\times\text{dist}(A',C')/(\text{dist}(O',A')+\text{dist}(O',C')),$$

where the functions dist(A',C'), dist(O',A'), and dist(O',C') represent the distances between A' and C', O' and A', and O' and C', respectively. For a large nodule, the normalization factor "1/(dist(O',A')+dist(O',C'))" reduced the internal cost function Int cost(A',C') caused by the difference in locations between two edge points A' and C'. That is to say, a relatively large difference in locations for two nodes was tolerable for a large nodule. When dist(O',A) is equal to dist(O',C'), the internal cost function Int cost(A',C') reached its minimum value, 2×Dist(A',F')/Dist(O',A')=2×sin(6°/2), which is approximately equal to 0.1. The smaller the internal cost, the smoother the outline at an outline point.

The external cost function for an edge point C is defined as the negative value of the number of intersection points on it, $$\text{Ext cost}(C')=-(\text{number of contour points on }C').$$

As discussed, the number of intersection points on an edge point indicates the likelihood that the edge point is a true edge point; therefore, a strong edge point provides a small external cost function. It should be noted that the external cost for an edge point does not depend on the edge points on a previous radial line. Using the local cost function defined above, the optimal (i.e., minimum cost) outline for a nodule determined by use of the dynamic programming technique would be a smooth curve located at strong edge points. The constant W in Eq. (2) is another important factor to be determined. In this study, the constant W is assigned a value of 110, which was approximately equal to the absolute value of the ratio of the mean external cost (approximately -22) to the mean internal cost (approximately 0.2) for the edge points on the outlines of 40 randomly selected nodules. This value of 110 for W performed very well for the database used in this study.

When there was no edge point on the current radial line, a virtual interpolated edge point was created with a relatively large penalty value for the local cost function. In fact, even for those radial lines with multiple edge points such as the current radial line with the edge points C' and D' in FIG. 8, a virtual edge point E' was still created because the costs of using the edge points C' and D' would be so large that even the use of the virtual edge point E' with a penalty was preferable. For example, if the edge points C' and D' were located too far away from the edge points A' and B', then the cost of using C' and D' would be very large (because of the internal cost function), and the virtual edge point E' would be a preferable choice over the edge points C' and D'. In order to determine the location of a virtual edge point on the current radial line J, an edge point (for example, the edge point A' in FIG. 8) on the previous radial line (J-1) was first selected if the cost of the partial optimal outline to it was smaller than those of the partial optimal outlines to all other edge points. The location of the virtual edge point (for example, the virtual edge point E' in FIG. 11) is then determined on the current radial line J such that the distance (dist(O',E')) between it and the center of the ROI was equal to that (dist(O',A')) between the edge point selected above and the center of the ROI. Based on Eq. (2), the penalty cost function for the virtual edge point E' in FIG. 8 should satisfy the following relationship:

$$\text{Local cost}(A',E')=W\times\text{Int cost}(A',E')+P>W\times\text{Int cost}(A',E')=110\times0.1=11,$$

where P is a positive penalty constant added to Local cost(A',E') because of the lack of a significant edge at E'. This inequality shows that the cost function for a virtual edge point should be larger than 11. In this study, we empirically determined a value of 20 as the penalty cost function for a virtual edge point.

Finally, for an edge point on the first radial line, only the external cost function was employed as the total cost for it, because it is the starting point of an outline. Another problem is that there may be a large discontinuity between the first node and the last (60th) node on the optimal outline determined by use of the dynamic programming technique. To overcome this problem, the dynamic programming algorithm recurred a total of 120 times sequentially for the radial lines 1, 2, 3, ..., 59, 60, 1, 2, 3, ..., 59, 60. Only the results for the last 60 recurrence were employed for the determination of the optimal outline for a nodule. FIG. 7(c) shows the segmentation result for the nodule in FIG. 7(a) by use of the dynamic programming technique.

Without the creation of the virtual edge points, either (1) the dynamic programming technique would terminate early at a radial line on which no edge point is detected, or (2) the outline of a nodule delineated by the dynamic programming technique would be attracted to "erroneous" edge points when there is no "correct" edge point detected at some radial lines. Therefore, it is important to employ such virtual edge points in the process of delineating the outline of a nodule by use of the dynamic programming technique.

FIG. 9 shows the six segmented nodule regions (see FIG. 3). The automated segmentation technique provided an approximate region, which is adequate for the subsequent analysis.

This invention conveniently may be implemented using a conventional general purpose computer or micro-processor programmed according to the teachings of the present invention, as will be apparent to those skilled in the computer art. Appropriate software can readily be prepared by programmers of ordinary skill based on the teachings of the present disclosure, as will be apparent to those skilled in the software art.

Figure 12:
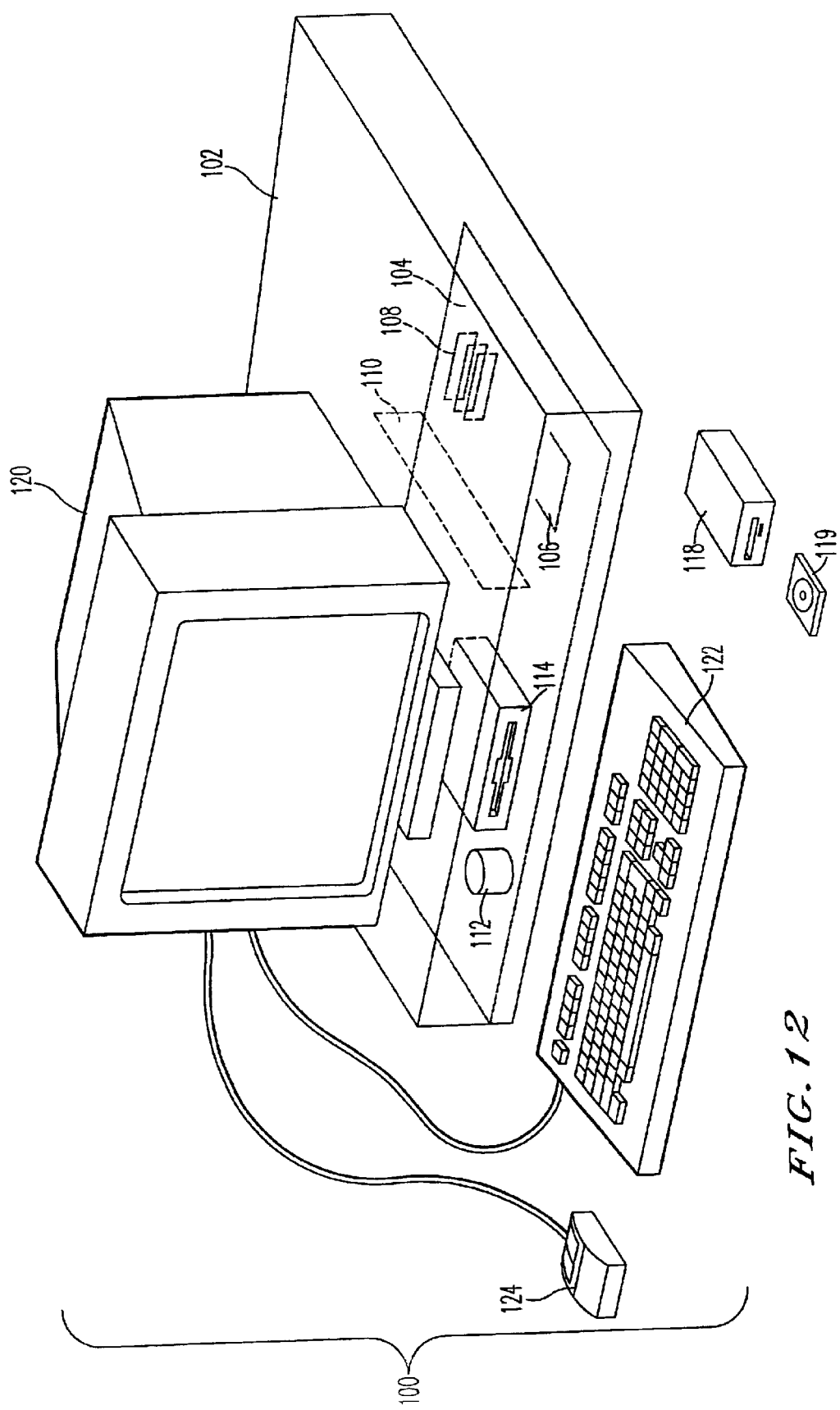
FIG. 12 illustrates a schematic illustration of a computer system for the computerized analysis of the likelihood of malignancy in pulmonary nodules.

FIG. 12 is a schematic illustration of a computer system for the computerized analysis of the likelihood of malignancy in pulmonary nodules. A computer 100 implements the method of the present invention, wherein the computer housing 102 houses a motherboard 104 which contains a CPU 106, memory 108 (e.g., DRAM, ROM, EPROM, EEPROM, SRAM, SDRAM, and Flash RAM), and other optional special purpose logic devices (e.g., ASICs) or configurable logic devices (e.g., GAL and reprogrammable FPGA). The computer 100 also includes plural input devices, (e.g., a keyboard 122 and mouse 124), and a display card 110 for controlling monitor 120. In addition, the computer 100 further includes a floppy disk drive 114; other removable media devices (e.g., compact disc 119, tape, and removable magneto-optical media (not shown)); and a hard disk 112, or other fixed, high density media drives, connected using an appropriate device bus (e.g., a SCSI bus, an Enhanced IDE bus, or a Ultra DMA bus). Also connected to the same device bus or another device bus, the computer 100 may additionally include a compact disc reader 118, a compact disc reader/writer unit (not shown) or a compact disc jukebox (not shown). Although compact disc 119 is shown in a CD caddy, the compact disc 119 can be inserted directly into CD-ROM drives which do not require caddies.

As stated above, the system includes at least one computer readable medium. Examples of computer readable media are compact discs 119, hard disks 112, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer 100 and for enabling the computer 100 to interact with a human user. Such software may include, but is not limited to, device drivers, operating systems and user applications, such as development tools. Such computer readable media further includes the computer program product of the present invention for performing the inventive method of disclosed above. The computer code devices of the present invention can be any interpreted or executable code mechanism, including but not limited to scripts, interpreters, dynamic link libraries, Java classes, and complete executable programs. Moreover, parts of the processing of the present invention may be distributed for better performance, reliability, and/or cost. For example, an outline or image may be selected on a first computer and sent to a second computer for remote diagnosis.

The invention may also be implemented by the preparation of application specific integrated circuits or by interconnecting an appropriate network of conventional component circuits, as will be readily apparent to those skilled in the art.

Numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for determining if a pulmonary nodule is malignant, comprising the steps of:

obtaining at least one computed tomography medical image of the pulmonary nodule;

obtaining at least one patient feature of a patient having the pulmonary nodule;

extracting image features of the pulmonary nodule from the at least one computed tomography medical image; and evaluating whether the pulmonary nodule is malignant based on an examination of a total of seven of the patient or image features, wherein the step of obtaining the patient features consists of obtaining the sex of the patient; and the step of extracting image features consists of extracting effective diameter of the pulmonary nodule, contrast of the pulmonary nodule, overlap measure of two gray-level histograms for the inside and outside regions of a segmented nodule of the medical image, overlap measure of two gray-level histograms for the inside and outside region of a segmented nodule of an edge gradient of the medical image, radial gradient index for an inside region of a segmented nodule of the medical image, and peak value of a histogram for an inside regions of a segmented nodule of an edge gradient of the medical image.

2. The method of claim 1, wherein the step of obtaining at least one computed tomography medical image comprises obtaining a medical X-ray image.

3. The method of claim 2, wherein the step of obtaining at least one computed tomography medical image comprises obtaining at least one low-dose computed tomography image.

4. The method of claim 1, wherein the step of obtaining at least one patient feature comprises obtaining at least one of sex and age of the patient having the pulmonary nodule.

5. The method of claim 1, wherein the step of extracting image features comprises at least one of the steps of:

identifying image features based on an outline of the at least one computed tomography medical image of the pulmonary nodule;

identifying image features based on linear patterns of the at least one computed tomography medical image of the pulmonary nodule;

identifying image features based on edge orientation of an edge gradient of the at least one computed tomography medical image of the pulmonary nodule;

identifying image features based on gray-level distribution of the at least one computed tomography medical image of the pulmonary nodules;

identifying image features based on the gray level distribution of an edge gradient of the at least one computed tomography medical image of the pulmonary nodule;

identifying image features based on the relationship between two histograms in the inside and outside regions of the segmented nodule of the at least one computed tomography medical image of the pulmonary nodule; and identifying image features based on the relationship between two histograms in the inside and outside regions of the segmented nodule of an edge gradient of the at least one computed tomography medical image of the pulmonary nodule.

6. The method of claim 5, wherein step of identifying image features based on an outline of the at least one computed tomography medical image of the pulmonary nodule comprises at least one of the following steps:
   identifying the effective diameter of the outline;
   identifying the degree of circularity of the outline;
   identifying the degree of ellipticity of the outline;
   identifying the degree of irregularity of the outline;
   identifying the root-mean-square variation of the power spectrum of the outline; and
   identifying the power spectrum of the outline.

7. The method of claim 5, wherein the step of identifying image features based on the linear patterns of the at least one computed tomography medical image of the pulmonary nodule comprises:
   identifying the magnitude of line patterns for inside region of a segmented nodule of the medical image; and
   identifying the magnitude of line patterns for outside region of a segmented nodule of the medical image.

8. The method of claim 5, wherein the step of identifying image features based on edge orientation of an edge gradient of the at least one computed tomography medical image of the pulmonary nodule comprises:
   identifying radial gradient index computed by the mean absolute value of a radial edge gradient projected along a radial direction for the inside of a segmented nodule of the medical image;
   identifying radial gradient index computed by the mean absolute value of a radial edge gradient projected along a radial direction for the outside of a segmented nodule of the medical image;
   identifying tangential gradient index computed by the mean absolute value of a tangential edge gradient projected along a tangential direction for the inside of a segmented nodule of the medical image; and
   identifying tangential gradient computed by the mean absolute value of a tangential edge gradient projected along a tangential direction for the outside of a segmented nodule of the image.

9. The method of claim 1, wherein the step of extracting image features consists of extracting the effective diameter of the pulmonary nodule and the contrast of the pulmonary nodule.

10. The method of claim 1, wherein the step of obtaining at least one medical image comprises:
    obtaining three medical images; and
    the step of evaluating if the pulmonary nodules are malignant is based on the examination of the three medical images.

11. A computer readable medium storing computer program instructions for determining if a pulmonary nodule is malignant, which when used to program a computer to cause the computer to perform the steps of:
    obtaining at least one computed tomography medical image of the pulmonary nodule;
    obtaining at least one patient feature of a patient having the pulmonary nodule;
    extracting image features of the pulmonary nodule from the at least one computed tomography medical image; and
    evaluating whether the pulmonary nodule is malignant based on an examination of a total of seven of the patient or image features, wherein
    the step of obtaining the patient features consists of obtaining the sex of the patient; and
    the step of extracting image features consists of extracting effective diameter of the pulmonary nodule, contrast of the pulmonary nodule, overlap measure of two gray-level histograms for the inside and outside regions of a segmented nodule of the medical image, overlap measure of two gray-level histograms for the inside and outside region of a segmented nodule of an edge gradient of the medical image, radial gradient index for an inside region of a segmented nodule of the medical image, and peak value of a histogram for an inside regions of a segmented nodule of an edge gradient of the medical image.

12. The computer readable medium of claim 11, wherein the step of obtaining at least one computed tomography medical image comprises obtaining a medical X-ray image.

13. The computer readable medium of claim 12, wherein the step of obtaining at least one computed tomography medical image comprises obtaining at least one low-dose computed tomography image.

14. The computer readable medium of claim 11, wherein the step of obtaining at least one patient feature comprises obtaining at least one of sex and age of the patient having the pulmonary nodule.

15. The computer readable medium of claim 11, wherein the step of extracting image features comprises at least one of the steps of:
    identifying image features based on an outline of the at least one computed tomography medical image of the pulmonary nodule;
    identifying image features based on linear patterns of the at least one computed tomography medical image of the pulmonary nodule;
    identifying image features based on edge orientation of an edge gradient of the at least one computed tomography medical image of the pulmonary nodule;
    identifying image features based on gray-level distribution of the at least one computed tomography medical image of the pulmonary nodules;
    identifying image features based on the gray level distribution of an edge gradient of the at least one computed tomography medical image of the pulmonary nodule;
    identifying image features based on the relationship between two histograms in the inside and outside regions of the segmented nodule of the at least one computed tomography medical image of the pulmonary nodule; and
    identifying image features based on the relationship between two histograms in the inside and outside regions of the segmented nodule of an edge gradient of the at least one computed tomography medical image of the pulmonary nodule.

16. The computer readable medium of claim 15, wherein step of identifying image features based on an outline of the at least one computed tomography medical image of the pulmonary nodule comprises at least one of the following steps:
    identifying the effective diameter of the outline;
    identifying the degree of circularity of the outline;
    identifying the degree of ellipticity of the outline;
    identifying the degree of irregularity of the outline;

identifying the root-mean-square variation of the power spectrum of the outline; and identifying the power spectrum of the outline.

17. The computer readable medium of claim 15, wherein the step of identifying image features based on the linear patterns of the at least one computed tomography medical image of the pulmonary nodule comprises:

identifying the magnitude of line patterns for inside region of a segmented nodule of the medical image; and identifying the magnitude of line patterns for outside region of a segmented nodule of the medical image.

18. The computer readable medium of claim 15, wherein the step of identifying image features based on edge orientation of an edge gradient of the at least one computed tomography medical image of the pulmonary nodule comprises:

identifying radial gradient index computed by the mean absolute value of a radial edge gradient projected along a radial direction for the inside of a segmented nodule of the medical image;

identifying radial gradient index computed by the mean absolute value of a radial edge gradient projected along a radial direction for the outside of a segmented nodule of the medical image;

identifying tangential gradient index computed by the mean absolute value of a tangential edge gradient projected along a tangential direction for the inside of a segmented nodule of the medical image; and identifying tangential gradient computed by the mean absolute value of a tangential edge gradient projected along a tangential direction for the outside of a segmented nodule of the image.

19. The computer readable medium of claim 11, wherein the step of extracting image features consists of extracting the effective diameter of the pulmonary nodule and the contrast of the pulmonary nodule.

20. The computer readable medium of claim 11, wherein the step of obtaining at least one medical image comprises:

obtaining three medical images; and the step of evaluating if the pulmonary nodules are malignant is based on the examination of the three medical images.

21. A system for determining if a pulmonary nodule is malignant, comprising:

a mechanism configured to obtain at least one computed tomography medical image of the pulmonary nodule;

a mechanism configured to obtain at least one patient feature of a patient having the pulmonary nodule;

a mechanism configured to extract image features of the pulmonary nodule from the at least one computed tomography medical image; and a mechanism configured to evaluate whether the pulmonary nodule is malignant based on an examination of a total of seven of the patient or image features, wherein the mechanism configured to obtain the patient features consists of a mechanism for obtaining the sex of the patient; and the mechanism configured to extract image features consists of a mechanism configured to extract effective diameter of the pulmonary nodule, contrast of the pulmonary nodule, overlap measure of two gray-level histograms for the inside and outside regions of a segmented nodule of the medical image, overlap measure of two gray-level histograms for the inside and outside region of a segmented nodule of an edge gradient of the medical image, radial gradient index for an inside region of a segmented nodule of the medical image, and peak value of a histogram for an inside regions of a segmented nodule of an edge gradient of the medical image.

22. The system of claim 21, wherein the mechanism configured to obtain at least one computed tomography medical image comprises a mechanism configured to obtain a medical X-ray image.

23. The system of claim 22, wherein the mechanism configured to obtain at least one computed tomography medical image comprises a mechanism configured to obtain at least one low-dose computed tomography image.

24. The system of claim 21, wherein the mechanism configured to obtain at least one patient feature comprises a mechanism configured to obtain at least one of sex and age of the patient having the pulmonary nodule.

25. The system of claim 21, wherein the mechanism for extracting image features comprises at least one of:

a mechanism configured to identify image features based on an outline of the at least one computed tomography medical image of the pulmonary nodule;

a mechanism configured to identify image features based on linear patterns of the at least one computed tomography medical image of the pulmonary nodule;

a mechanism configured to identify image features based on edge orientation of an edge gradient of the at least one computed tomography medical image of the pulmonary nodule;

a mechanism configured to identify image features based on gray-level distribution of the at least one computed tomography medical image of the pulmonary nodules;

a mechanism configured to identify image features based on the gray level distribution of an edge gradient of the at least one computed tomography medical image of the pulmonary nodule;

a mechanism configured to identify image features based on the relationship between two histograms in the inside and outside regions of the segmented nodule of the at least one computed tomography medical image of the pulmonary nodule; and a mechanism configured to identify image features based on the relationship between two histograms in the inside and outside regions of the segmented nodule of an edge gradient of the at least one computed tomography medical image of the pulmonary nodule.

26. The system of claim 25, wherein the mechanism configured to identify image features based on an outline of the at least one computed tomography medical image of the pulmonary nodule comprises at least one of the following:

a mechanism configured to identify the effective diameter of the outline;

a mechanism configured to identify the degree of circularity of the outline;

a mechanism configured to identify the degree of ellipticity of the outline;

a mechanism configured to identify the degree of irregularity of the outline;

a mechanism configured to identify the root-mean-square variation of the power spectrum of the outline; and a mechanism configured to identify the power spectrum of the outline.

27. The system of claim 25, wherein the mechanism configured to identify image features based on the linear patterns of the at least one computed tomography medical image of the pulmonary nodule comprises:
  a mechanism configured to identify the magnitude of line patterns for inside region of a segmented nodule of the medical image; and
  a mechanism configured to identify the magnitude of line patterns for outside region of a segmented nodule of the medical image.

28. The system of claim 25, wherein the mechanism configured to identify image features based on edge orientation of an edge gradient of the at least one computed tomography medical image of the pulmonary nodule comprises:
  a mechanism configured to identify radial gradient index computed by the mean absolute value of a radial edge gradient projected along a radial direction for the inside of a segmented nodule of the medical image;
  a mechanism configured to identify radial gradient index computed by the mean absolute value of a radial edge gradient projected along a radial direction for the outside of a segmented nodule of the medical image;
  a mechanism configured to identify tangential gradient index computed by the mean absolute value of a tangential edge gradient projected along a tangential direction for the inside of a segmented nodule of the medical image; and
  a mechanism configured to identify tangential gradient computed by the mean absolute value of a tangential edge gradient projected along a tangential direction for the outside of a segmented nodule of the image.

29. The system of claim 21, wherein the mechanism configured to extract image features consists of a mechanism configured to extract the effective diameter of the pulmonary nodule and the contrast of the pulmonary nodule.

30. The system of claim 21, wherein the mechanism configured to obtain at least one medical image comprises:
  a mechanism configured to obtain three medical images; and
  the mechanism configured to evaluate if the pulmonary nodules are malignant is based on the examination of the three medical images.

31. A method for determining if a pulmonary nodule is malignant, comprising:
  obtaining at least one computed tomography medical image of the pulmonary nodule;
  obtaining at least one patient feature of a patient having the pulmonary nodule;
  extracting image features of the pulmonary nodule from the at least one computed tomography medical image; and
  evaluating whether the pulmonary nodule is malignant based on an examination of a total of seven of the patient or image features,
  wherein the step of extracting image features comprises at least one of the steps of
    identifying image features based on an outline of the at least one computed tomography medical image of the pulmonary nodule;
    identifying image features based on linear patterns of the at least one computed tomography medical image of the pulmonary nodule;
    identifying image features based on edge orientation of an edge gradient of the at least one computed tomography medical image of the pulmonary nodule;
    identifying image features based on gray-level distribution of the at least one computed tomography medical image of the pulmonary nodules;
    identifying image features based on the gray level distribution of an edge gradient of the at least one computed tomography medical image of the pulmonary nodule;
    identifying image features based on the relationship between two histograms in the inside and outside regions of the segmented nodule of the at least one computed tomography medical image of the pulmonary nodule; and
    identifying image features based on the relationship between two histograms in the inside and outside regions of the segmented nodule of an edge gradient of the at least one computed tomography medical image of the pulmonary nodule, and
  wherein the step of identifying image features based on the linear patterns of the at least one computed tomography medical image of the pulmonary nodule comprises
    identifying the magnitude of line patterns for inside region of a segmented nodule of the medical image; and
    identifying the magnitude of line patterns for outside region of a segmented nodule of the medical image.

32. A method for determining if a pulmonary nodule is malignant, comprising:
  obtaining at least one computed tomography medical image of the pulmonary nodule;
  obtaining at least one patient feature of a patient having the pulmonary nodule;
  extracting image features of the pulmonary nodule from the at least one computed tomography medical image; and
  evaluating whether the pulmonary nodule is malignant based on an examination of a total of seven of the patient or image features,
  wherein the step of extracting image features comprises at least one of the steps of
    identifying image features based on an outline of the at least one computed tomography medical image of the pulmonary nodule;
    identifying image features based on linear patterns of the at least one computed tomography medical image of the pulmonary nodule;
    identifying image features based on edge orientation of an edge gradient of the at least one computed tomography medical image of the pulmonary nodule;
    identifying image features based on gray-level distribution of the at least one computed tomography medical image of the pulmonary nodules;
    identifying image features based on the gray level distribution of an edge gradient of the at least one computed tomography medical image of the pulmonary nodule;
    identifying image features based on the relationship between two histograms in the inside and outside regions of the segmented nodule of the at least one computed tomography medical image of the pulmonary nodule; and
    identifying image features based on the relationship between two histograms in the inside and outside regions of the segmented nodule of an edge gradient of the at least one computed tomography medical image of the pulmonary nodule, and
  the step of identifying image features based on edge orientation of an edge gradient of the at least one computed tomography medical image of the pulmonary nodule comprises identifying radial gradient index computed by the mean absolute value of a radial edge gradient projected along a radial direction for the inside of a segmented nodule of the medical image;

identifying radial gradient index computed by the mean absolute value of a radial edge gradient projected along a radial direction for the outside of a segmented nodule of the medical image;

identifying tangential gradient index computed by the mean absolute value of a tangential edge gradient projected along a tangential direction for the inside of a segmented nodule of the medical image; and identifying tangential gradient computed by the mean absolute value of a tangential edge gradient projected along a tangential direction for the outside of a segmented nodule of the image.

33. A computer readable medium storing computer program instructions for determining if a pulmonary nodule is malignant, which when used to program a computer to cause the computer to perform the steps of:

obtaining at least one computed tomography medical image of the pulmonary nodule;

obtaining at least one patient feature of a patient having the pulmonary nodule;

extracting image features of the pulmonary nodule from the at least one computed tomography medical image; and evaluating whether the pulmonary nodule is malignant based on an examination of a total of seven of the patient or image features, wherein the step of extracting image features comprises at least one of the steps of identifying image features based on an outline of the at least one computed tomography medical image of the pulmonary nodule;

identifying image features based on linear patterns of the at least one computed tomography medical image of the pulmonary nodule;

identifying image features based on edge orientation of an edge gradient of the at least one computed tomography medical image of the pulmonary nodule;

identifying image features based on gray-level distribution of the at least one computed tomography medical image of the pulmonary nodules;

identifying image features based on the gray level distribution of an edge gradient of the at least one computed tomography medical image of the pulmonary nodule; identifying image features based on the relationship between two histograms in the inside and outside regions of the segmented nodule of the at least one computed tomography medical image of the pulmonary nodule; and identifying image features based on the relationship between two histograms in the inside and outside regions of the segmented nodule of an edge gradient of the at least one computed tomography medical image of the pulmonary nodule, and the step of identifying image features based on the linear patterns of the at least one computed tomography medical image of the pulmonary nodule comprises identifying the magnitude of line patterns for inside region of a segmented nodule of the medical image; and identifying the magnitude of line patterns for outside region of a segmented nodule of the medical image.

34. A computer readable medium storing computer program instructions for determining if a pulmonary nodule is malignant, which when used to program a computer to cause the computer to perform the steps of:

obtaining at least one computed tomography medical image of the pulmonary nodule;

obtaining at least one patient feature of a patient having the pulmonary nodule;

extracting image features of the pulmonary nodule from the at least one computed tomography medical image; and evaluating whether the pulmonary nodule is malignant based on an examination of a total of seven of the patient or image features, wherein the step of extracting image features comprises at least one of the steps of identifying image features based on an outline of the at least one computed tomography medical image of the pulmonary nodule;

identifying image features based on linear patterns of the at least one computed tomography medical image of the pulmonary nodule;

identifying image features based on edge orientation of an edge gradient of the at least one computed tomography medical image of the pulmonary nodule;

identifying image features based on gray-level distribution of the at least one computed tomography medical image of the pulmonary nodules;

identifying image features based on the gray level distribution of an edge gradient of the at least one computed tomography medical image of the pulmonary nodule;

identifying image features based on the relationship between two histograms in the inside and outside regions of the segmented nodule of the at least one computed tomography medical image of the pulmonary nodule; and identifying image features based on the relationship between two histograms in the inside and outside regions of the segmented nodule of an edge gradient of the at least one computed tomography medical image of the pulmonary nodule, and the step of identifying image features based on edge orientation of an edge gradient of the at least one computed tomography medical image of the pulmonary nodule comprises identifying radial gradient index computed by the mean absolute value of a radial edge gradient projected along a radial direction for the inside of a segmented nodule of the medical image;

identifying radial gradient index computed by the mean absolute value of a radial edge gradient projected along a radial direction for the outside of a segmented nodule of the medical image;

identifying tangential gradient index computed by the mean absolute value of a tangential edge gradient projected along a tangential direction for the inside of a segmented nodule of the medical image; and identifying tangential gradient computed by the mean absolute value of a tangential edge gradient projected along a tangential direction for the outside of a segmented nodule of the image.

35. A system for determining if a pulmonary nodule is malignant, comprising:

a mechanism configured to obtain at least one computed tomography medical image of the pulmonary nodule;

a mechanism configured to obtain at least one patient feature of a patient having the pulmonary nodule;

a mechanism configured to extract image features of the pulmonary nodule from the at least one computed tomography medical image; and a mechanism configured to evaluate whether the pulmonary nodule is malignant based on an examination of a total of seven of the patient or image features, wherein the mechanism configured to evaluate image features comprises at least one of a mechanism configured to identify image features based on an outline of the at least one computed tomography medical image of the pulmonary nodule;

a mechanism configured to identify image features based on linear patterns of the at least one computed tomography medical image of the pulmonary nodule;

a mechanism configured to identify image features based on edge orientation of an edge gradient of the at least one computed tomography medical image of the pulmonary nodule;

a mechanism configured to identify image features based on gray-level distribution of the at least one computed tomography medical image of the pulmonary nodules;

a mechanism configured to identify image features based on the gray level distribution of an edge gradient of the at least one computed tomography medical image of the pulmonary nodule;

a mechanism configured to identify image features based on the relationship between two histograms in the inside and outside regions of the segmented nodule of the at least one computed tomography medical image of the pulmonary nodule; and a mechanism configured identify image features based on the relationship between two histograms in the inside and outside regions of the segmented nodule of an edge gradient of the at least one computed tomography medical image of the pulmonary nodule, wherein the mechanism configured to identify image features based on the linear patterns of the at least one computed tomography medical image of the pulmonary nodule comprises a mechanism configured to identify the magnitude of line patterns for inside region of a segmented nodule of the medical image; and a mechanism configured to identify the magnitude of line patterns for outside region of a segmented nodule of the medical image.

36. A system for determining if a pulmonary nodule is malignant, comprising:

a mechanism configured to obtain at least one computed tomography medical image of the pulmonary nodule;

a mechanism configured to obtain at least one patient feature of a patient having the pulmonary nodule;

a mechanism configured to extract image features of the pulmonary nodule from the at least one computed tomography medical image; and a mechanism configured to evaluate whether the pulmonary nodule is malignant based on an examination of a total of seven of the patient or image features, wherein the mechanism configured to identify image features comprises at least one of a mechanism configured to identify image features based on an outline of the at least one computed tomography medical image of the pulmonary nodule;

a mechanism configured to identify image features based on linear patterns of the at least one computed tomography medical image of the pulmonary nodule;

a mechanism configured to identify image features based on edge orientation of an edge gradient of the at least one computed tomography medical image of the pulmonary nodule;

a mechanism configured to identify image features based on gray-level distribution of the at least one computed tomography medical image of the pulmonary nodules;

a mechanism configured to identify image features based on the gray level distribution of an edge gradient of the at least one computed tomography medical image of the pulmonary nodule;

a mechanism configured to identify image features based on the relationship between two histograms in the inside and outside regions of the segmented nodule of the at least one computed tomography medical image of the pulmonary nodule; and a mechanism configured to identify image features based on the relationship between two histograms in the inside and outside regions of the segmented nodule of an edge gradient of the at least one computed tomography medical image of the pulmonary nodule, wherein the mechanism configured to identify image features based on edge orientation of an edge gradient of the at least one computed tomography medical image of the pulmonary nodule comprises a mechanism configured to identify radial gradient index computed by the mean absolute value of a radial edge gradient projected along a radial direction for the inside of a segmented nodule of the medical image;

a mechanism configured to identify radial gradient index computed by the mean absolute value of a radial edge gradient projected along a radial direction for the outside of a segmented nodule of the medical image;

a mechanism configure to identify tangential gradient index computed by the mean absolute value of a tangential edge gradient projected along a tangential direction for the inside of a segmented nodule of the medical image; and a mechanism configured to identify tangential gradient computed by the mean absolute value of a tangential edge gradient projected along a tangential direction for the outside of a segmented nodule of the image.

* * * * *